United States Patent
Hunter et al.

(10) Patent No.: US 8,093,941 B2
(45) Date of Patent: Jan. 10, 2012

(54) SYSTEMS AND DEVICES FOR DYNAMICALLY SCALED CHARGE PUMPING

(75) Inventors: Bradford Lawrence Hunter, Austin, TX (US); Richard David Nicholson, Austin, TX (US); Tsing Hsu, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 15 days.

(21) Appl. No.: 12/708,533

(22) Filed: Feb. 18, 2010

(65) Prior Publication Data
US 2011/0089996 A1 Apr. 21, 2011

Related U.S. Application Data

(60) Provisional application No. 61/251,809, filed on Oct. 15, 2009.

(51) Int. Cl.
*G05F 1/10* (2006.01)
(52) U.S. Cl. ...................................................... 327/536
(58) Field of Classification Search .................. 327/535, 327/536, 537
See application file for complete search history.

(56) References Cited

U.S. PATENT DOCUMENTS

| | | | | |
|---|---|---|---|---|
| 6,492,862 B2* | 12/2002 | Nakahara | | 327/536 |
| 6,903,599 B2* | 6/2005 | Chen et al. | | 327/536 |
| 7,362,165 B1* | 4/2008 | Chen | | 327/536 |
| 7,474,141 B2* | 1/2009 | Huang et al. | | 327/536 |
| 7,692,477 B1* | 4/2010 | Chen | | 327/534 |
| 7,764,525 B2* | 7/2010 | Hsieh et al. | | 363/60 |

* cited by examiner

*Primary Examiner* — Jeffrey Zweizig
(74) *Attorney, Agent, or Firm* — William B. Kempler; Wade J. Brady, III; Frederick J. Telecky

(57) ABSTRACT

Systems and devices for dynamically scaled charge pumping are presented. Example embodiments of the disclosed systems of dynamically scaled charge pumping enable regulation of the output voltage at a particular ratio and to dynamically control the ratio based on the input voltage. A charge pumping circuit is enabled by an oscillator. The charge pump oscillator is enabled by the output of a comparator. The comparator compares an input voltage to a comparator voltage, which is a divided version of the output voltage. The output voltage is referenced to a regulated voltage and the comparison voltage is divided between the two voltages by a resistor divider. The regulated voltage remains flat until the input voltage equals the reference voltage. At that point, the regulated voltage will begin to rise and follow the input voltage. Before the reference voltage is reached, the output voltage equals the input voltage multiplied by the resistor divider ratio. Once the input voltage reaches the reference voltage, the difference between the output voltage and the input voltage becomes a constant.

19 Claims, 3 Drawing Sheets

SYSTEMS AND DEVICES FOR DYNAMICALLY SCALED CHARGE PUMPING

CROSS-REFERENCE TO RELATED APPLICATION

This application claims benefit to U.S. provisional patent application Ser. No. 61/251,809, filed on Oct. 15, 2009, which is incorporated by reference herein.

TECHNICAL FIELD

The present disclosure is generally related to electronics and, more particularly, is related to voltage comparators.

BACKGROUND

A charge pump circuit uses an input voltage to generate an output voltage that is higher in level than the input voltage. A charge pump is a kind of DC to DC converter that uses capacitors as energy storage elements to create either a higher or lower voltage power source. Charge pumps use some form of switching device(s) to control the connection of voltages to the capacitor. For instance, to generate a higher voltage, the first stage involves the capacitor being connected across a voltage and charged up. In the second stage, the capacitor is disconnected from the original charging voltage and reconnected with its negative terminal to the original positive charging voltage. Because the capacitor retains the voltage across it (ignoring leakage effects) the positive terminal voltage is added to the original, effectively doubling the voltage.

The pulsing nature of the higher voltage output is typically smoothed by the use of an output capacitor. This is the charge pumping action, which typically operates at tens of kilohertz up to several megahertz to minimize the amount of capacitance required. The capacitor used as the charge pump is typically known as the "flying capacitor." Another way to explain the operation of a charge pump is to consider it as the combination of a DC to AC converter (the switches) followed by a voltage multiplier. The voltage is load-dependent; higher loads result in lower average voltages. Charge pumps can double voltages, triple voltages, halve voltages, invert voltages, fractionally multiply or scale voltages such as ×3/2, ×4/3, ×2/3, etc. and generate arbitrary voltages, depending on the controller and circuit topology.

Capacitive voltage conversion is achieved by switching a capacitor periodically. Passive diodes can perform this switching function in the simplest cases, if an alternating voltage is available. Otherwise, DC voltage levels require the use of active switches, which first charge the capacitor by connecting it across a voltage source and then connect it to the output in a way that produces a different voltage level.

FIG. 1 provides a common integrated circuit 100 using this principle, which may be considered to be the prototype of the classic charge pump. Circuit 100 integrates switches and an oscillator so that switches 110, 130 and 120, 140 work alternately. The configuration shown in FIG. 1 inverts input voltage 105. With a slight change in the external connections, circuit 100 can double or divide the input voltage as well. Closing switch 110 and switch 130 charges flying capacitor 150, to input voltage 105 in the first half cycle of the oscillator period. In the second half cycle of the oscillator period, switch 110 and switch 130 open and switch 120 and switch 140 close. This action connects the positive terminal of capacitor 150 to ground and connects the negative terminal of capacitor 150 to output to VOUT 180. Capacitor 150 is then in parallel with the reservoir capacitor 160.

If the voltage across capacitor 160 is smaller than that across capacitor 150, charge flows from capacitor 150 to capacitor 160 until the voltage across capacitor 160 reaches the inverse of input voltage 105. An integrated fixed-frequency oscillator drives the periodic switching in circuit 100. This circuit has no output regulation, and the switching frequency remains constant for all loads. Thus, the output voltage variation depends strongly on the load. With no load, the output voltage corresponds to the negative input voltage: VOUT=−(V+). As the output load increases, the magnitude of VOUT increases. Since VOUT is actually the inverse of VIN, a load to 0V would tend to increase vout (VOUT then being less negative).

Output current for this type of circuit may, therefore, be limited. This is partly due to a low oscillator frequency, and partly due to integrated analog switches which are far from ideal. These switches in the "on" state exhibit several ohms of on-resistance. Additionally, charge pumps are generally power inefficient. There are heretofore unaddressed needs with previous charge pump circuits.

SUMMARY

Example embodiments of the present disclosure provide systems of dynamically scaled charge pumping. Briefly described, in architecture, one example embodiment of the system, among others, can be implemented as follows: an input voltage port with a voltage present on the input port; and an output voltage port with a voltage present on the output port, such that, when the voltage present on the input port is less than a reference voltage, the relationship of the voltage present on the output port to the voltage present on the input port is a ratio, and when the voltage present on the input port is greater than a reference voltage, the relationship of the voltage present on the output port to the voltage present on the input port is substantially a constant.

Embodiments of the present disclosure can also be viewed as providing devices for dynamically scaled charge pumping In this regard, one embodiment of such a device, among others, can be broadly summarized by the following: a charge pump circuit with an input voltage and an output voltage, the charge pump circuit electrically connected to a comparator, the charge pump circuit enabled by an output of the comparator, the comparator configured to compare the input voltage to a comparison voltage, the comparison voltage generated as a divided version of the output voltage.

DETAILED DESCRIPTION

Figure 1:
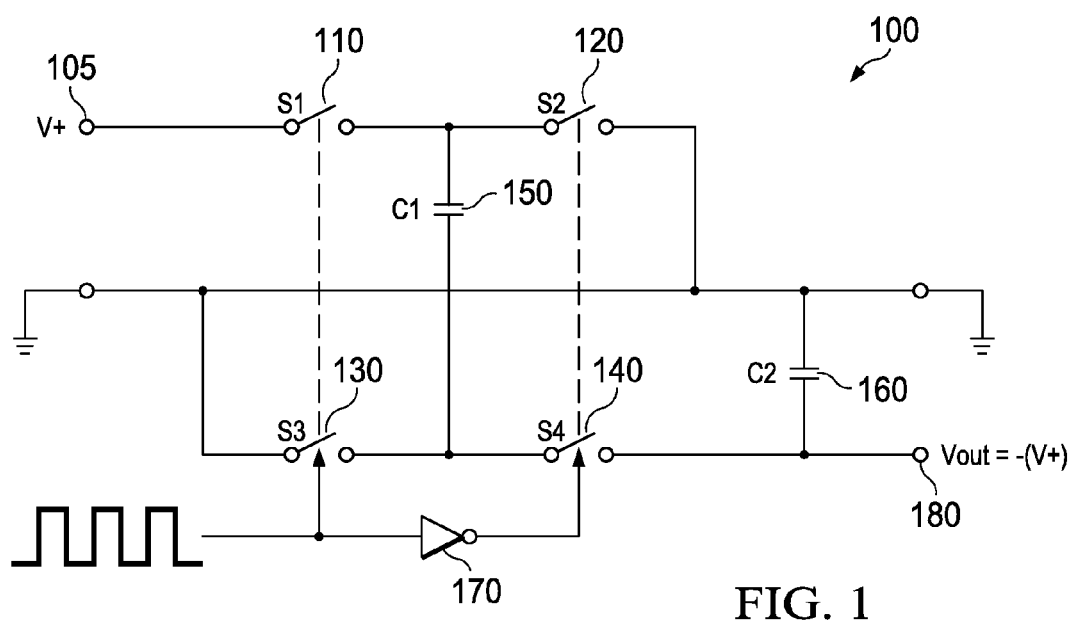
FIG. 1 is a circuit diagram of an example embodiment of a prior art charge pump circuit.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

A charge pump circuit may use an input voltage to generate an output voltage that is higher in level than the input voltage. The output voltage (VOUT) may be limited to two times the input voltage (VIN) for each charge pump stage. Charge pumps can be actively regulated to produce a particular output voltage from a given input voltage. Actively regulated charge pumps may be disabled when the pump output voltage exceeds the regulated value. The current consumption (efficiency) of the charge pump is a function of the ratio of time that the charge pump is disabled to the time that the charge pump is enabled. If the input voltage has a wide range of allowable operation, the efficiency is reduced at low input voltages. The charge pump may be enabled more often to meet the same regulated output voltage at lower input voltages. Efficiency may be reduced at lower input voltages.

In a charge pump application, an input voltage is used to generate an output voltage greater than the input voltage by multiplying the input voltage. Example embodiments of the disclosed systems of dynamically scaled charge pumping enable regulation of the output voltage at a particular ratio and to dynamically control the ratio based on the input voltage. In a standard charge pump, the output VOUT is, for example, 12V above VIN—a boost of 12V. The standard charge pump generates a boost that is dependent upon the input voltage, where VOUT=VIN×Rdiv1/Rdiv2. A different output voltage is generated when VIN=1, than when VIN =2.

In many applications, the maximum output voltage requirement is relaxed at low input voltage levels. Dynamically scaling the charge pump output voltage maximizes charge pump efficiency at low input voltages. In example embodiments, the charge pump design can be relaxed (for example, by a reduction in 2× pump stages) because the output voltage level is reduced at lower input voltage levels.

Dynamic scaling has advantages over discrete scaling. Discrete scaling is implemented by measuring the input voltage with comparators that check for discrete input voltage levels. Discrete scaling with discrete samples requires a discrete comparator for each desired level of adjustment in the output voltage versus input voltage. Different output voltage ratios of the input voltage can be selected based in the output measurements of the comparators. In this way, the same effect of dynamically scaling the output voltage ratio is achieved discretely. Changing from one level to another creates discrete output noise near the comparator threshold crossings.

Figure 2:
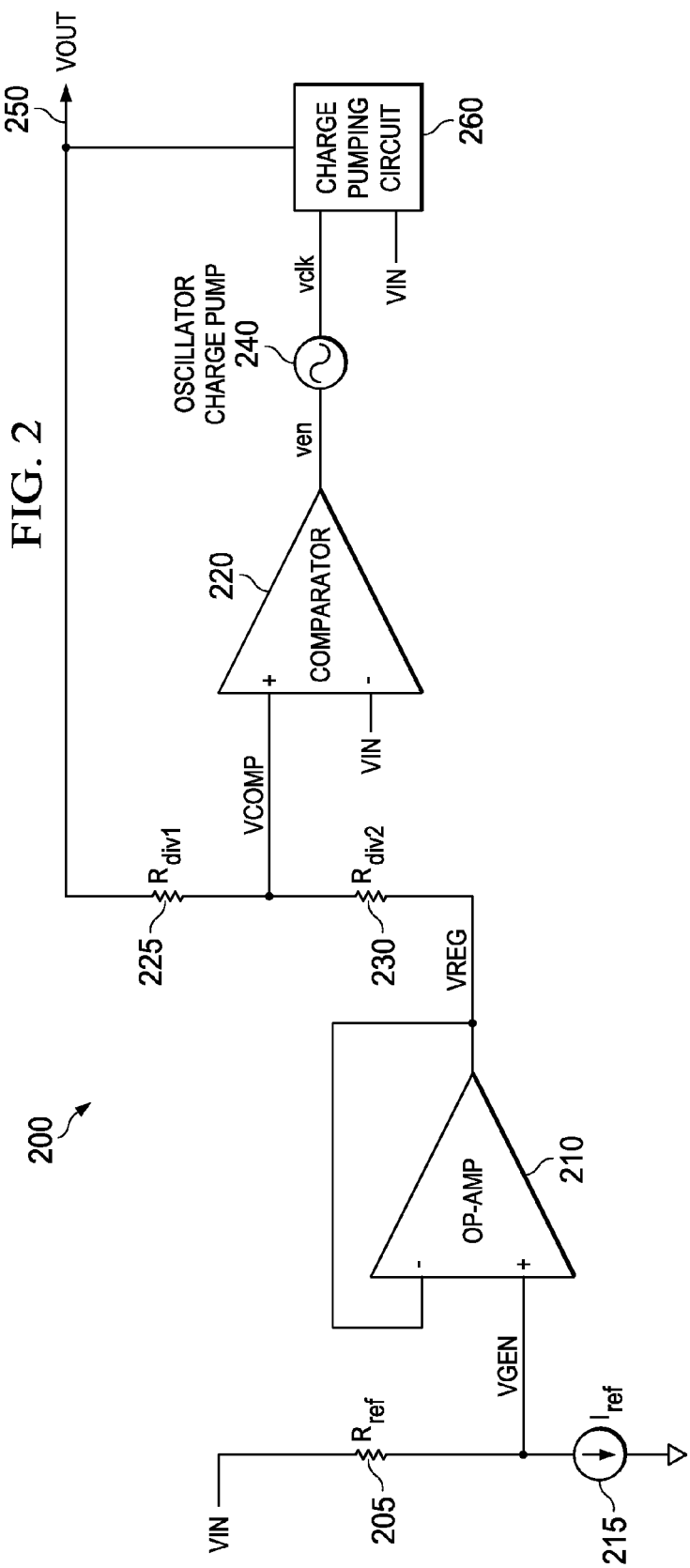
FIG. 2 is a circuit diagram of an example embodiment of a system of dynamically scaled charge pumping.

FIG. 2 provides a schematic of an example embodiment of circuit 200 for dynamically scaled charge pumping. Circuits such as circuit 100 in FIG. 1 may implement a traditional actively regulated charge pump by connecting the VREG node at the bottom of resistor 230 of FIG. 2 to ground. VOUT then becomes a function of VIN: VOUT=VIN×(Rdiv1/Rdiv2). The disclosed systems and devices of dynamically scaled charge pumping generates a VREG to replace the connection to ground in the traditional charge pump. If VIN is greater than the reference voltage level Vref, then VGEN is the difference between VIN and Vref, where Vref=Iref×Rref. Otherwise, if VIN is less then Vref, then VGEN is substantially 0V.

The constant reference voltage level may be generated in a variety of methods. However, Vref is preferably referenced from VIN. VREG may stay at ground (0V) until VIN=Vref. When VIN reaches Vref, VREG will then track changes in (VIN–Vref). At low input voltages, the difference between VOUT and VIN is relaxed.

In FIG. 2, charge pumping circuit 260 is enabled by charge pump oscillator 240. Charge pump oscillator 240 is enabled by the output of comparator 220. Comparator 220 compares an input voltage to VCOMP which is a ratio of VOUT–VREG. The ratio is a function of resistor 225 and resistor 230. VREG is a buffered output of VGEN. VGEN may be generated by a current source. Iref may be generated by a field effect transistor (FET) based current source in one non-limiting embodiment.

The VGEN voltage is flat until VIN reaches the point where Rref×Iref is less than VIN. At that point, VGEN will begin to rise and follow VIN. VREG=VGEN because op amp 210 is configured as a unity gain buffer. VGEN is buffered because of the resistor divider. VREG may be set equal to VGEN as a virtual ground reference at the bottom of the resistor stack. If VGEN is at ground, VREG is also at ground. VOUT then may be multiplied with respect to VIN because VIN is being fed back into the comparator.

The closed loop configuration of comparator 220 will set VCOMP at VIN. Comparator 220 acts like a standard op amp in a closed loop configuration. Comparator 220 turns oscillator 240 on and off. Oscillator 240 generates a signal for charge pump 260. Oscillator 240 is used to charge the capacitors in charge pump 260. If oscillator 240 is turned off, charge pump 260 stops working and VOUT 250 starts to fall. When oscillator 240 is turned on, charge pump 260 starts operating and VOUT 250 starts to rise. Comparator 220 turns oscillator 240 on dynamically to get VCOMP=VIN, which creates a multiplication because of the resistor divider ratio. For example, VOUT=VIN×Rdiv1/Rdiv2. As VIN increases, VCOMP increases. As VCOMP increases, VOUT increases.

Figure 4:
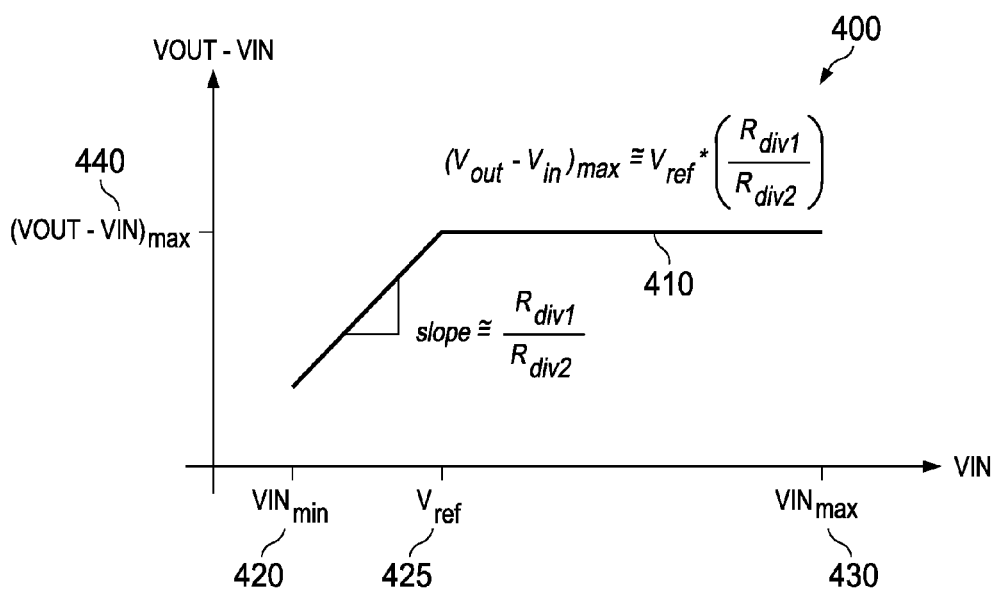
FIG. 4 is a signal diagram of an example embodiment of the charge pump circuit of FIG. 2.

As VREG begins to rise at the same rate as VIN, (once VIN reaches Vref,

VGEN starts to increase. VREG increases also and there is no change between VREG and VIN. The differential voltage is not increasing as VIN rises) VIN is rising at the input to the comparator. However, VREG at the bottom of the virtual ground is increasing at the same rate. Therefore, there is no relative increase in VOUT. VOUT may increase at the same rate as VIN and at the same rate as VREG. The whole circuit will stabilize at that same multiplication ratio. There will be a constant differential between VOUT and VIN and that differential will not increase once VGEN reaches Vref. The differential is a ratio until VIN reaches Vref. FIG. 4 presents a graph of the VOUT–VIN differential. Once Vref is reached, the differential between VOUT and VIN becomes Vref×Rdiv1/Rdiv2. Before Vref is reached, VOUT=VIN×Rdiv1/Rdiv2.

In applications at low input voltages, it may not be desirable to pump the output voltage to the maximum differential from VOUT and VIN. An example embodiment of the disclosed systems of dynamically scaled charge pumping allows the pump voltage to be relaxed. There is a maximum voltage that VOUT can reach with respect to VIN which is dependent on the number of stages of the charge pump. For a one stage charge pump, VOUT can be 2× VIN. For a two stage charge pump, VOUT can be 3× VIN. For a three stage charge pump, VOUT can be 4× VIN. There are also losses and inefficiencies that will decrease the actual output voltage.

Often, to maximize the efficiency, for example, with a three stage charge pump, if the desired output voltage is VIN×2.5, the charge pump does not need to run all the time. Sometimes the charge pump can be turned off. In this example, the charge pump operates for a while, and over-pumps the output voltage. Then the regulator may turn off the oscillator and the output voltage may drift down. Then the comparator turns the oscillator back on until it is biased to the desired output voltage. So, the output voltage is regulated in a loop.

In an example application, VIN is 2 V and the desired output is 12V. Five charge pump stages will be used to provide the desired boost, which is very power hungry. Five charge pump stages also uses a large amount of chip area and is very expensive. In another example application, when VIN is 2V, the desired output is 4V. A further requirement of this application is a 12V output when VIN is 6V. When VIN is lower, the voltage does not need to be pumped as much. When VIN is higher, the voltage needs to be pumped more. The disclosed systems of dynamically scaled charge pumping allow the scaling of VOUT based on VIN.

Figure 3:
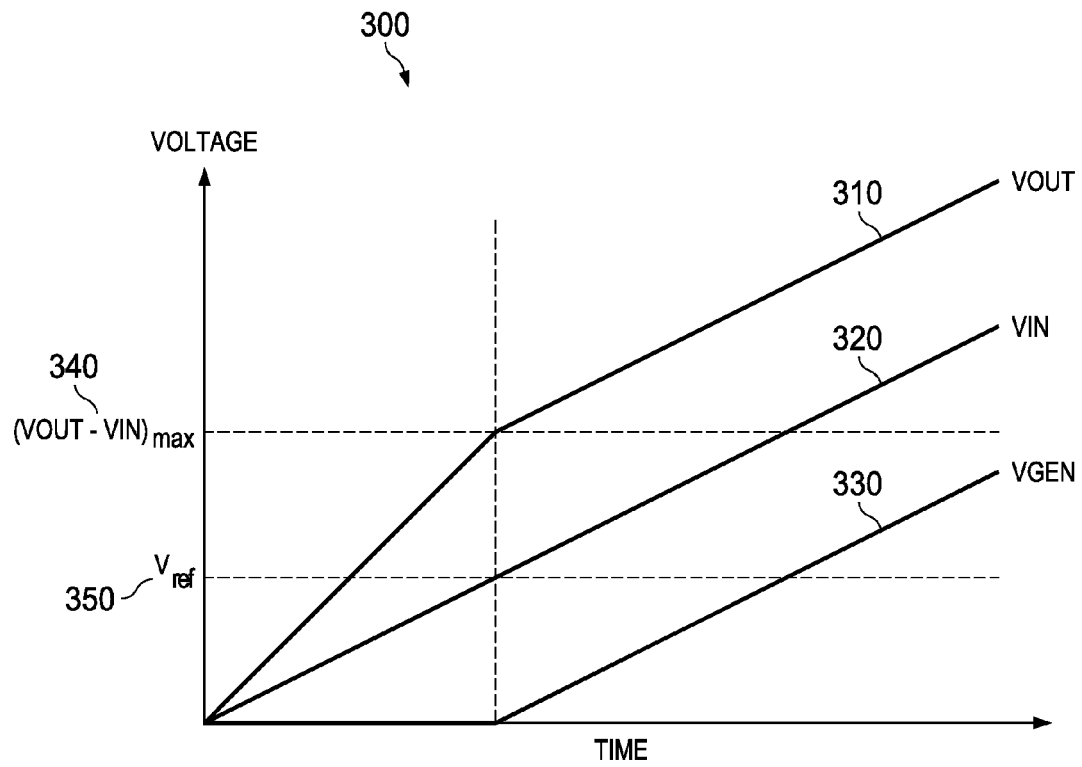
FIG. 3 is a signal diagram of an example embodiment of the charge pump circuit of FIG. 2.

FIG. 3 provides a time domain analysis of VOUT, VIN, and VGEN given a constant increase in VIN. As shown in the graph of FIG. 3, VGEN 330 is used to control whether VOUT 310 is a ratio of VIN 320 or whether VOUT−VIN is a constant. Up until the point where VGEN 330 begins to rise, VOUT 310 is a multiplied ratio of VIN 320. As VIN 320 increases, the difference between VOUT 310 and VIN 320 is multiplied until VGEN 330 begins to rise. This occurs when VIN 320 reaches Vref 350. Then the difference between VOUT 310 and VIN 320 becomes constant—which is VOUT−VIN(max) 340.

FIG. 4 provides a graph of VOUT minus VIN as a function of VIN. The charge pump efficiency is lowest when VIN is between VINmin and Vref. Dynamic charge pump output voltage scaling from VINmin to Vref allows the efficiency to remain constant over the selected low voltage range. The difference between VOUT and VIN is multiplied until VIN approaches Vref. Once Vref is reached, the difference between VOUT and VIN becomes constant.

Therefore, at least the following is claimed:

1. A device comprising:
a charge pump circuit with an input voltage and an output voltage, the charge pump circuit electrically connected to a comparator, the charge pump circuit enabled by an output of the comparator, the comparator configured to compare the input voltage to a comparison voltage, the comparison voltage generated as a divided portion of the output voltage, wherein the divided portion is generated by a voltage divider having a first terminal coupled to the output voltage and a second terminal coupled to a dynamic scaling circuit which varies voltage at the second terminal to change a relationship between the input voltage and the output voltage.

2. The device of claim 1, further comprising a reference voltage level generated by passing a fixed current from a current source through a resistor, the reference voltage configured to set the change in relationship between the input voltage and the output voltage.

3. The device of claim 2, wherein, when the input voltage is less than the reference voltage level, the output voltage to input voltage relationship is a ratio.

4. The device of claim 2, wherein, when the input voltage is greater than the reference voltage level, the output voltage to input voltage relationship is substantially a constant.

5. The device of claim 1, wherein the divided portion is determined by the configuration of a resistor divider.

6. The device of claim 5, further comprising an operational amplifier electrically connected between the resistor divider and a generator of a reference voltage level.

7. A charge pump circuit, comprising:
an input voltage port with a voltage present on the input port; and
an output voltage port with a voltage present on the output port, such that, when the voltage present on the input port is less than a reference voltage level, the relationship of the voltage present on the output port to the voltage present on the input port is a ratio, and when the voltage present on the input port is greater than a reference voltage level, the relationship of the voltage present on the output port to the voltage present on the input port is substantially a constant.

8. The charge pump circuit of claim 7, further comprising a clock input port configured to receive a clock input, the clock input configured to regulate the voltage on the output port at a desired voltage level.

9. The charge pump circuit of claim 7, further comprising a comparator configured to compare the voltage present on the input port with a comparator voltage, the comparator further configured to set the ratio and/or the constant.

10. The charge pump circuit of claim 9, wherein the comparator is configured in a closed loop circuit.

11. The charge pump circuit of claim 10, further comprising a generated voltage configured to set the level at which the relationship between the voltage present on the output port and the voltage present on the input port switches from a ratio to substantially a constant.

12. The charge pump circuit of claim 11, wherein the voltage generator comprises a current source and a resistor.

13. The charge pump circuit of claim 11, wherein the generator comprises one or more field effect transistors.

14. The charge pump circuit of claim 7, wherein the ratio is set with a resistor divider.

15. A system, comprising:
an input voltage port;
an output voltage port;
a reference voltage level generator electrically connected to the input voltage port;
a resistor divider electrically connected to the reference voltage level generator;
a comparator electrically connected to the resistor divider and to the input voltage port, the comparator configured to compare the voltage on the input voltage port to a voltage from the resistor divider;
an oscillator electrically connected to an output of the comparator; and
a charge pumping circuit electrically connected to the oscillator, wherein,
when the voltage present on the input voltage port is less than a voltage generated by the reference voltage generator, the relationship of the voltage present on the output voltage port to the voltage present on the input voltage port is a ratio, and when the voltage present on the input voltage port is greater than the voltage generated by the reference voltage generator, the relationship of the voltage present on the output voltage port to the voltage present on the input voltage port is substantially a constant.

16. The system of claim 15, wherein the oscillator enables the charge pumping circuit.

17. The system of claim 15, wherein the output of the comparator enables the oscillator.

18. The system of claim 15, wherein the resistor divider sets a ratio for the relationship between the voltage on the input voltage port and the output voltage port.

19. The system of claim 15, wherein the reference generator comprises one or more field effect transistors.

* * * * *